United States Patent
Ohmi et al.

(10) Patent No.: US 7,787,076 B2
(45) Date of Patent: Aug. 31, 2010

(54) BACKLIGHT UNIT FOR LIQUID CRYSTAL DISPLAY

(75) Inventors: Tadahiro Ohmi, Miyagi (JP); Yasuyuki Shirai, Miyagi (JP); Kiwamu Takehisa, Miyagi (JP)

(73) Assignee: Tohoku University, Sendai-Shi, Miyagi (JP)

( * ) Notice: Subject to any disclaimer, the term of this patent is extended or adjusted under 35 U.S.C. 154(b) by 105 days.

(21) Appl. No.: 11/989,424

(22) PCT Filed: Jul. 21, 2006

(86) PCT No.: PCT/JP2006/314461

§ 371 (c)(1),
(2), (4) Date: Jan. 25, 2008

(87) PCT Pub. No.: WO2007/013364

PCT Pub. Date: Feb. 1, 2007

(65) Prior Publication Data

US 2009/0231514 A1    Sep. 17, 2009

(30) Foreign Application Priority Data

Jul. 27, 2005    (JP) .............................. 2005-217729

(51) Int. Cl.
*G02F 1/1335* (2006.01)

(52) U.S. Cl. .............................. 349/67; 349/65; 349/70; 362/614; 362/615; 362/628

(58) Field of Classification Search .................. 349/67, 349/70; 362/611–615, 623, 628
See application file for complete search history.

(56) References Cited

U.S. PATENT DOCUMENTS 4,664,481 A * 5/1987 Ito et al. ...................... 349/62
5,812,225 A * 9/1998 de Lauzun et al. ............ 349/67
6,768,529 B2 * 7/2004 Umemoto et al. ........... 349/114

FOREIGN PATENT DOCUMENTS

| JP | 8-293205 | 11/1996 |
| JP | 2005-085718 A | 3/2005 |
| JP | 2006-260924 A | 9/2006 |

* cited by examiner

*Primary Examiner*—Richard H Kim
(74) *Attorney, Agent, or Firm*—Foley & Lardner LLP

(57) ABSTRACT

As a shape on a cross-section vertical to a longitudinal direction (L) of the hot cathode fluorescent lamp (20*a* (20*b*)), a light source rear side reflecting plane (62) of a reflector (60) includes a mound portion (623). The mound portion (623) is defined by two recessed inclining planes and protrudes toward a hot cathode fluorescent lamp (20*a* (20*b*)).

17 Claims, 5 Drawing Sheets

BACKLIGHT UNIT FOR LIQUID CRYSTAL DISPLAY

This application is the National Phase of PCT/JP2006/314461, filed Jul. 21, 2006, which claims priority to Japanese Application No. 2005-217729, filed Jul. 27, 2005, the disclosures of which are hereby incorporated by reference in their entirety.

TECHNICAL FIELD

This invention relates to a backlight unit adapted for a liquid crystal display such as a large-sized liquid crystal display and having a hot-cathode fluorescent lamp or the like as a light source and to a liquid crystal display having such a backlight.

BACKGROUND ART

Generally, a fluorescent lamp used as a light source in a backlight unit for a liquid crystal display is a mercury lamp (a low-pressure mercury vapor discharge lamp, to be exact) with a phosphor coated on the inner surface thereof. In terms of light-emission mechanisms, fluorescent lamps are classified into a hot-cathode fluorescent lamp (hot-cathode tube) that emits light by thermionic emission and a cold-cathode fluorescent lamp (cold-cathode tube) that emits light by secondary electron emission.

The cold-cathode fluorescent lamp has a lifetime of as much as about 50,000 hours, which is as much as five times longer than that of the hot-cathode type being about 10,000 hours. Accordingly, the cold-cathode fluorescent lamp is normally used as a light source for a liquid crystal display.

In the meantime, in a large-sized liquid crystal display exceeding 30 inches, as many as 10 or more cold-cathode tubes are required due to an increase in required quantity of light following the increase in size and, therefore, there has arisen a problem that the power consumption increases to 200 W or more. Further, not only the number of cold-cathode tubes simply increases, but also an inverter is required per cold-cathode tube and, therefore, an increase in cost has also arisen as a problem. Although a measure may be considered that increases the light-emission amount from each cold-cathode tube by thickening it so as to reduce the number used per display, the light-emission efficiency of a cold-cathode tube is inversely proportional to the tube diameter, thus resulting in an increase in power consumption, and therefore, the measure using thick cold-cathode tubes is ultimately not effective. Consequently, in practice, use is made of ten or more relatively thin cold-cathode tubes having a diameter of about 2 to 3 mm.

In contrast thereto, it has also been proposed to use, instead of the cold-cathode fluorescent lamp, a hot-cathode fluorescent lamp as a light source of a backlight unit. The hot-cathode fluorescent lamp can achieve a light-emission efficiency as high as twice or more that of the cold-cathode type and further is not subjected to a reduction in light-emission efficiency even if it is thickened, and therefore, hot-cathode fluorescent lamps having a diameter of up to about 30 mm are used in illuminators and so on. Further, the light-emission amount (total luminous flux) of a single hot-cathode fluorescent lamp is normally as much as 2000 lumens or more and thus can achieve a quantity of light as much as about ten times that of a single cold-cathode tube (diameter 2 to 3 mm).

The structure of a liquid crystal display backlight unit using hot-cathode fluorescent lamps as light sources is described, for example, in Japanese Patent Application No. 2005-0076431 proposed by the present applicant. FIG. 1 shows the structure of a backlight unit similar to the proposed structure.

The structure shown in FIG. 1 comprises two hot-cathode fluorescent lamps 20a and 20b as light sources each having a shape with a longitudinal direction, i.e. a columnar shape, a rod shape, or a tubular shape, and disposed on the outside of upper and lower sides of a liquid crystal panel 10 having a rectangular plate shape, with their longitudinal direction L along those sides, respectively, and a reflector 50 serving to reflect light, radiated from the peripheries of the fluorescent lamps 20a and 20b, so as to be incident on the back surface of the liquid crystal panel 10. FIG. 1 is a cross-sectional view perpendicular to the longitudinal direction of the fluorescent lamps 20a and 20b. The reflector 50 comprises a main reflecting surface portion 51 facing the back surface of the liquid crystal panel 10, two light source back-side reflecting surface portions 52 continuous with the main reflecting surface portion 51 and facing at least regions, not facing the back surface of the liquid crystal panel 10, of the peripheries of the fluorescent lamps 20a and 20b, respectively, and a mountain-shaped portion 512 projecting in a triangular mountain shape toward the liquid crystal panel 10 at a position facing a (vertical) center portion of the liquid crystal panel 10. The mountain-shaped portion 512 is formed for obtaining a uniform light intensity distribution over the back surface of the liquid crystal panel 10. The shape of the light source back-side reflecting surface portion 52 in a cross-section perpendicular to the longitudinal direction of the fluorescent lamp is a substantially semicircular shape concentric with the periphery, circular in cross-section, of the fluorescent lamp.

DISCLOSURE OF THE INVENTION

Problem to be Solved by the Invention

In the liquid crystal display backlight unit shown in FIG. 1, for reasons such that the periphery of the fluorescent lamp is relatively close to the light source back-side reflecting surface portion, much of the light radiated from the region, not facing the liquid crystal panel, of the periphery of the fluorescent lamp is reflected by the light source back-side reflecting surface portion in a direction returning to the fluorescent lamp. That is, much of the reflected light from the light source back-side reflecting surface portion is absorbed by a phosphor of the fluorescent lamp before reaching the liquid crystal panel so as to be lost. That is, the ratio of the light, radiated from the light source, that actually reaches the liquid crystal panel (hereinafter referred to as the light use efficiency) is low.

In the case of using a hot-cathode fluorescent lamp as a light source, a measure may be considered that prolongs the lifetime thereof by increasing the length of a filament for the purpose of improving its basically shorter lifetime than the lifetime of the cold-cathode type. In this case, the diameter of a lamp tube increases and thus the circumference of the lamp tube increases. Herein, when taking into account the foregoing light use efficiency, in the hot-cathode fluorescent lamp with the increased circumference due to the increase in diameter, its circumference facing a light source back-side reflecting surface portion of a reflector also increases and, as a result, the quantity of light reflected by the light source back-side reflecting surface portion so as to return to the lamp without reaching a liquid crystal panel also increases.

Further, in the case of setting the volume of the reflector to be substantially equal to that of a reflector for a normal small-diameter hot-cathode fluorescent lamp for the purpose of not excessively increasing the size of the reflector and thus the size of a backlight unit, it is necessary that the large-diameter fluorescent lamp be accommodated in the limited volume and thus the periphery of the fluorescent lamp further approaches the light source back-side reflecting surface portion, so that the quantity of light reflected by the light source back-side reflecting surface portion so as to return to the lamp without reaching the liquid crystal panel further increases.

That is, the reduction in light use efficiency is more significant in the liquid crystal display backlight unit having the hot-cathode fluorescent lamp with the prolonged lifetime.

It is therefore an object of this invention to provide a liquid crystal display backlight unit capable of exhibiting a high light use efficiency.

It is another object of this invention to provide a liquid crystal display backlight unit achieving both compactness and an improvement in light use efficiency.

It is still another object of this invention to provide a liquid crystal display backlight unit achieving both an increase in lifetime of a light source and an improvement in light use efficiency.

It is another object of this invention to provide a liquid crystal display comprising the liquid crystal display backlight unit as described above.

Means for Solving the Problem

According to this invention, at least the following aspects 1 to 10 are provided.

(1) A liquid crystal display backlight unit in which the unit comprises:

a light source having a shape with a longitudinal direction and disposed on a back side and on an outside of a side of the liquid crystal panel having a rectangular plate shape, with the longitudinal direction along the side; and a reflector reflecting light, radiated from a periphery of the light source, so as to be incident on a back surface of the liquid crystal panel;

in which the reflector includes:

a main reflecting surface portion facing the back surface of the liquid crystal panel; and a light source back-side reflecting surface portion facing at least a region, not facing the back surface of the liquid crystal panel, of the periphery of the light source;

in which the light source back-side reflecting surface portion of the reflector comprises, as a shape in a cross-section perpendicular to the longitudinal direction of the light source, a mountain-shaped portion defined by two inclined concave surfaces and projecting toward the light source.

(2) The liquid crystal display backlight unit of the aspect (1), in which the light source back-side reflecting surface portion further comprises, as a shape in a cross-section perpendicular to the longitudinal direction of the light source, two concave surface portions, the concave surface portions including the inclined concave surfaces of the mountain-shaped portion and concave surfaces extending from the inclined concave surfaces, respectively.

(3) The liquid crystal display backlight unit of the aspect (1) or (2), in which the light source, as a shape in a cross-section perpendicular to the longitudinal direction, has an oblong circular shape or an elliptic shape and is disposed so that a major-axis direction of the oblong circle or the ellipse forms an angle of 90 degrees or less with respect to a line segment connecting a center of the oblong circle or the ellipse and a center of the liquid crystal panel in a direction perpendicular to the side thereof.

(4) The liquid crystal display backlight unit of any one of the aspects (1) through (3), in which the light source is a fluorescent lamp.

(5) The liquid crystal display backlight unit of the aspect (4), in which the light source is a hot-cathode fluorescent lamp.

(6) The liquid crystal display backlight unit of the aspect (4) or (5), in which the light source, in an end region in the longitudinal direction, has an oblong circular shape or an elliptic shape as a shape in a cross-section perpendicular to the longitudinal direction and comprises a filament disposed along a major-axis direction of the oblong circle or the ellipse.

(7) The liquid crystal display backlight unit of the aspect (4) or (5), in which the light source comprises:

a light-emitting portion extending along the side of the liquid crystal panel over a length equal to or greater than that of the side and having a circular shape as a shape in a cross-section perpendicular to the longitudinal direction; and electrode portions provided at both ends of the light-emitting portion in the longitudinal direction and each having a circular shape with a diameter greater than that of the light-emitting portion as a shape in a cross-section perpendicular to the longitudinal direction, each of the electrode portions comprising a filament disposed therein;

in which the reflector reflects light radiated from a periphery of the light-emitting portion of the light source.

(8) The liquid crystal display backlight unit of any one of the aspects (1) through (7), in which the liquid crystal display backlight unit comprises the light sources provided for two opposite sides of the liquid crystal panel, respectively.

(9) The liquid crystal display backlight unit of the aspect (1), (2), (3), or (8), in which the light source is an LED array having a plurality of LEDs arranged in the longitudinal direction.

(10) A liquid crystal display characterized by comprising the liquid crystal display backlight unit of any of the aspects 1 to 9 and the liquid crystal panel.

Effect of the Invention

A liquid crystal display backlight unit according to this invention can exhibit a high light use efficiency.

Further, a liquid crystal display backlight unit according to this invention can achieve both compactness and an improvement in light use efficiency.

Further, a liquid crystal display backlight unit according to this invention can achieve both an increase in lifetime of a light source and an improvement in light use efficiency.

Further, in a liquid crystal display according to this invention, a liquid crystal display backlight unit being its component exhibits the effect as described above.

BEST MODE FOR CARRYING OUT THE INVENTION

Figure 1:
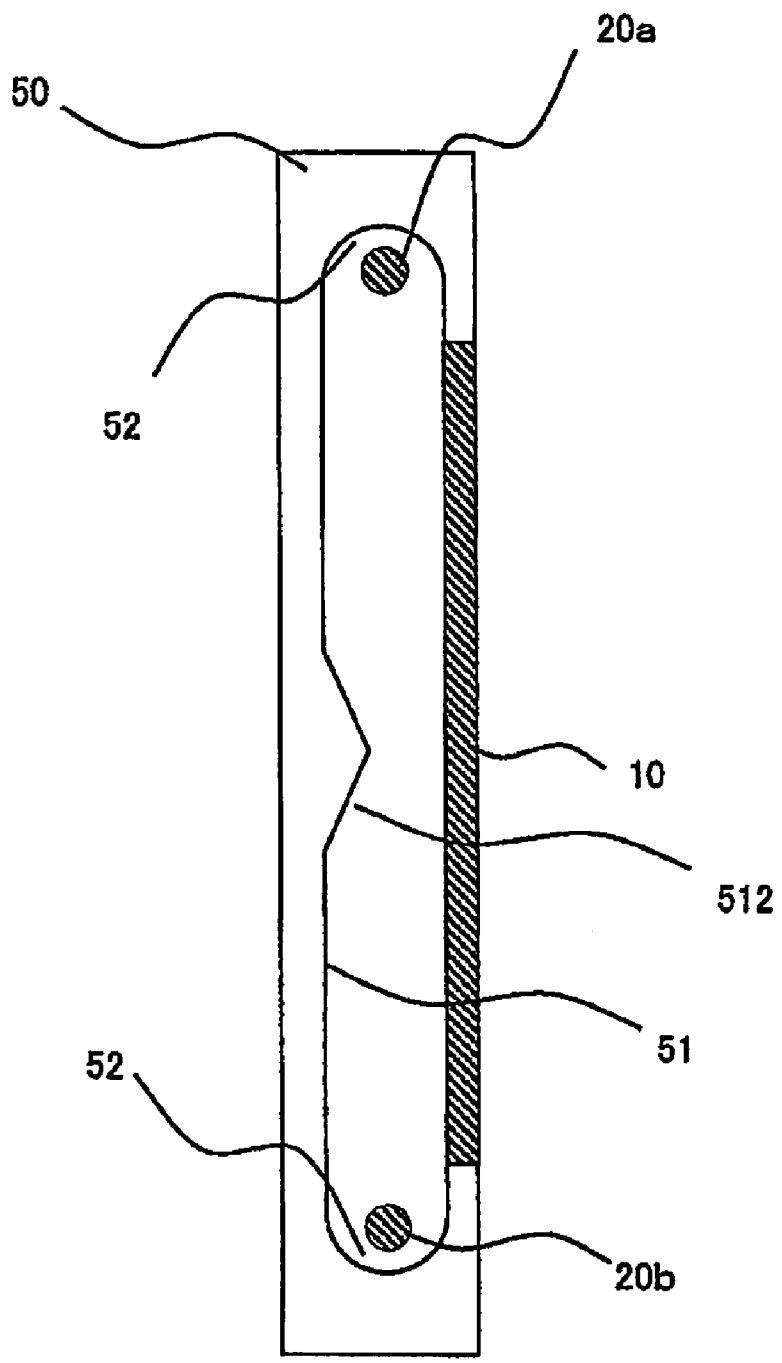
FIG. 1 is a cross-sectional view showing the structure of one example of a liquid crystal display backlight unit.

A liquid crystal display backlight unit according to this invention comprises a light source having a shape with a longitudinal direction and disposed on the back side of a liquid crystal panel and on the outside of a side of the liquid crystal panel, with its longitudinal direction along the side of the liquid crystal panel, and a reflector reflecting light, radiated from the periphery of the light source, so as to be incident on the back surface of the liquid crystal panel. The reflector comprises a main reflecting surface portion facing the back surface of the liquid crystal panel and a light source back-side reflecting surface portion facing at least a region, not facing the back surface of the liquid crystal panel, of the periphery of the light source. Particularly, the light source back-side reflecting surface portion of the reflector includes a mountain-shaped portion defined by two inclined concave surfaces and projecting toward the light source, as a shape in a cross-section perpendicular to the longitudinal direction of the light source.

In the liquid crystal display backlight unit with such a structure according to this invention, much of light radiated from the region, not facing the liquid crystal panel, of the periphery of the light source hits the mountain-shaped portion in the light source back-side reflecting surface portion of the reflector. Then, much of reflected light from the mountain-shaped portion proceeds to the back surface of the liquid crystal panel or the main reflecting surface portion of the reflector without directly returning to the light source. That is, the light that returns to the light source to be lost in the structure as the example shown in FIG. 1 reaches the liquid crystal panel and therefore the light use efficiency is improved.

In the liquid crystal display backlight unit according to this invention, the cross-sectional shape, in the longitudinal direction, of the light source may have an oblong circular shape or an elliptic shape in the foregoing structure.

According to the liquid crystal display backlight unit with such a structure according to this invention, since a filament can be disposed parallel to a major-axis direction of the ellipse or the oblong circle as the cross-sectional shape, it is possible to ensure a long filament length and thus to achieve an increase in lifetime of the light source, in addition to the effect of improving the light use efficiency by the foregoing structure.

Further, the liquid crystal display backlight unit according to this invention may be configured to have a light source with only electrode portions being thick, in addition to the reflector structure with the light source back-side reflecting surface portion including the mountain-shaped portion.

Also in this case, since a filament can be disposed in the large-diameter electrode portion, it is possible to ensure a long filament length and thus to achieve an increase in life-time of the light source, in addition to the effect of improving the light use efficiency by the foregoing structure.

EMBODIMENTS

Hereinbelow, referring to the drawings, a description will be given of liquid crystal display backlight units and liquid crystal displays according to embodiments of this invention.

Embodiment 1

Figure 2:
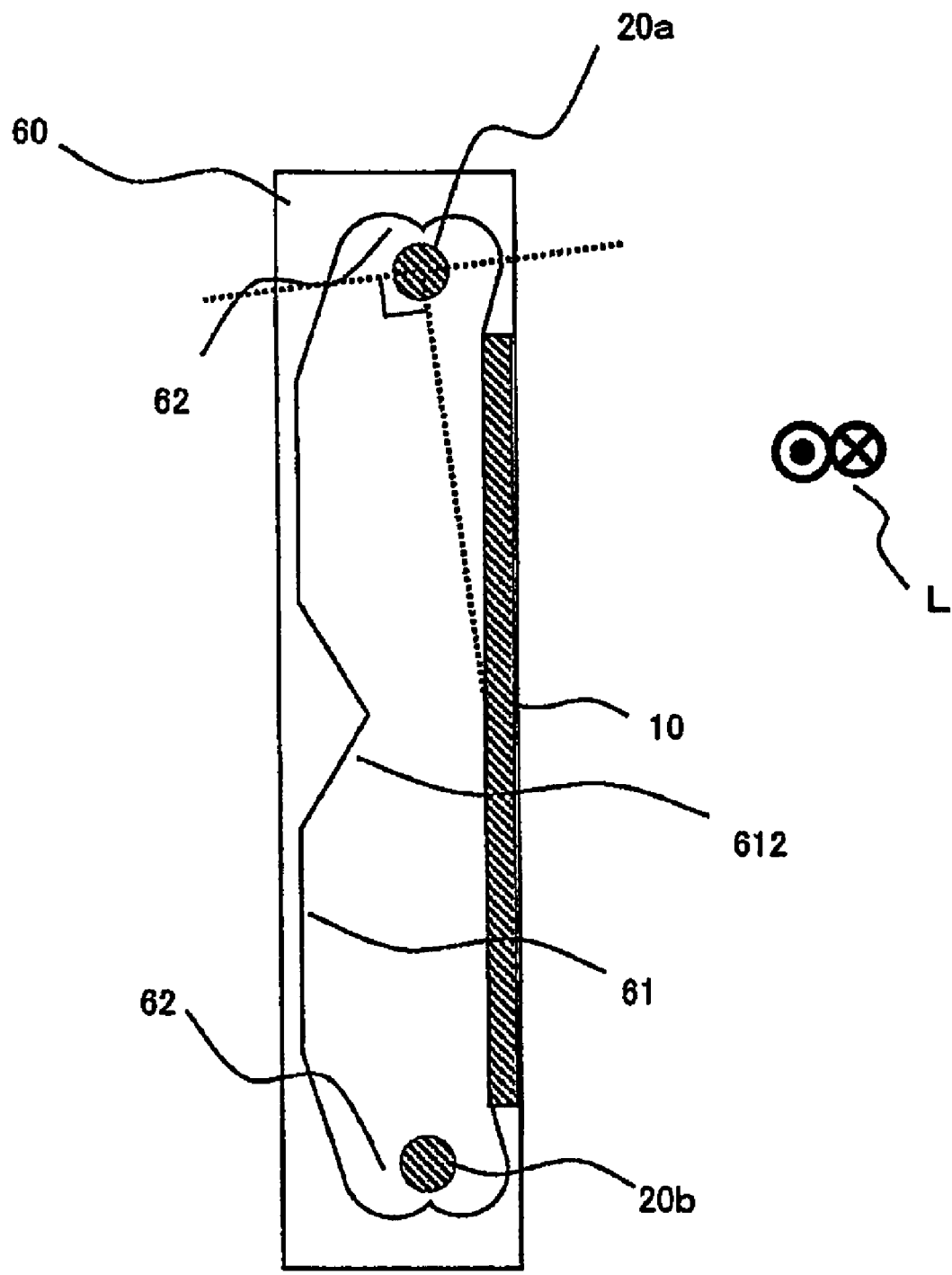
FIG. 2 is a cross-sectional view showing the structure of a liquid crystal display backlight unit according to Embodiment 1 of this invention.
Figure 3:
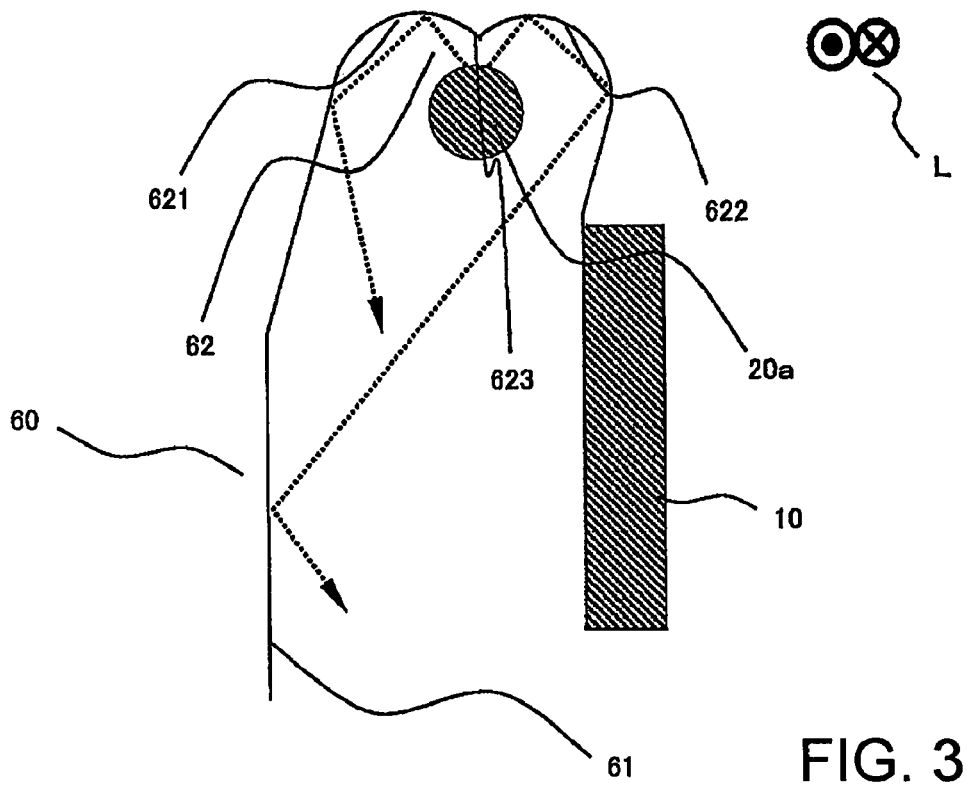
FIG. 3 is a diagram for explaining details of light radiation from a fluorescent lamp in the liquid crystal display backlight unit shown in FIG. 2.

Referring to FIGS. 2 and 3, a liquid crystal display backlight unit according to Embodiment 1 of this invention comprises, like in the example shown in FIG. 1, hot-cathode fluorescent lamps 20a and 20b as light sources each having a shape with a longitudinal direction L and disposed on the back side of a liquid crystal panel 10 having a rectangular plate shape and on the outside of upper and lower sides of the liquid crystal panel 10, with their longitudinal direction L along those sides, respectively, and a reflector 60 serving to reflect light, radiated from the peripheries of the hot-cathode fluorescent lamps 20a and 20b, so as to be incident on the back surface of the liquid crystal panel 10. The reflector 60 comprises a main reflecting surface portion 61 facing the back surface of the liquid crystal panel 10 and light source back-side reflecting surface portions 62 facing at least regions, not facing the back surface of the liquid crystal panel 10, of the peripheries of the hot-cathode fluorescent lamps 20a and 20b, respectively.

The hot-cathode fluorescent lamps 20a and 20b each have a circular shape as a cross-sectional shape perpendicular to the longitudinal direction L.

The main reflecting surface portion 61 of the reflector 60 includes, in its vertical center region, a mountain-shaped portion 612 projecting toward the liquid crystal panel 10. Further, a reflecting film mainly of aluminum is coated on the surface of the main reflecting surface portion 61 and the light source back-side reflecting surface portions 62 of the reflector 60. However, silver may be coated instead and, in either case, a protective film may further be formed on the reflecting film.

Particularly, in this liquid crystal display backlight, as shown in FIG. 3, the light source back-side reflecting surface portion 62 of the reflector 60 includes a mountain-shaped portion 623 as a shape in a cross-section perpendicular to the longitudinal direction L of the hot-cathode fluorescent lamp 20a (20b). The mountain-shaped portion 623 is defined by two inclined concave surfaces and projects toward (the center of the circle in cross-section of) the hot-cathode fluorescent lamp 20a (20b).

The light source back-side reflecting surface portion 62 further includes two concave surface portions 621 and 622 respectively comprising the inclined concave surfaces of the mountain-shaped portion 623 and concave surfaces extending from the inclined concave surfaces, respectively, as a shape in a cross-section perpendicular to the longitudinal direction L of the hot-cathode fluorescent lamp 20a (20b). In this embodiment, since the curvature of the inclined concave surface and the curvature of the concave surface are set equal to each other, it can be said that the concave surface portions 621 and 622 each presents a partial circle. Therefore, the light source back-side reflecting surface portion 62 will be called a double-circle type in terms of its cross-sectional shape. On the other hand, the light source back-side reflecting surface portion 52 shown in FIG. 1 will be called a single-circle type in terms of its cross-sectional shape.

Referring to FIG. 3, the function of the double-circle type light source back-side reflecting surface portion 62 in the reflector 60 will be explained. FIG. 3 shows, by two broken lines, examples of light beams radiated and proceeding from the region, not facing the back surface of the liquid crystal panel 10, of the periphery of the hot-cathode fluorescent lamp 20a. Since these light beams hit the inclined concave surfaces of the mountain-shaped portion 623 in the light source back-side reflecting surface portion 62, reflected light beams thereof do not directly hit (return to) the periphery of the hot-cathode fluorescent lamp 20a (20b).

Therefore, the light beam that returns to the light source without reaching the back surface of the liquid crystal panel in the example shown in FIG. 1 reaches the back surface of the liquid crystal panel 10 in this invention and thus the light use efficiency is improved.

Figure 4:
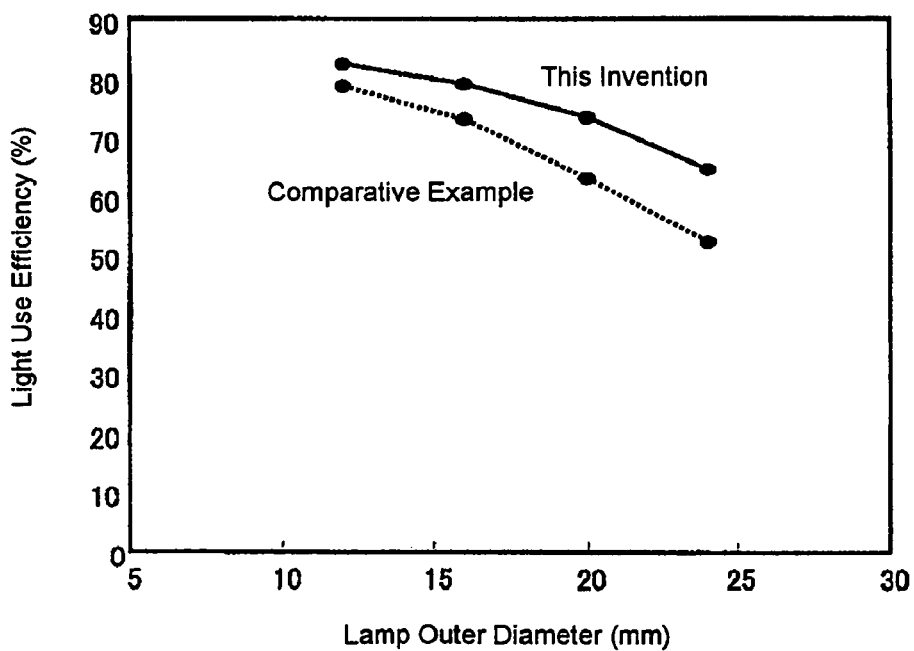
FIG. 4 is a graph showing the verification results on the light use efficiency with respect to the liquid crystal display backlight unit according to this invention and a comparative example.

Next, FIG. 4 shows the results of carrying out a simulation about the light use efficiency for comparison between the reflector 60 having the double-circle type light source back-side reflecting surface portion 62 and the reflector 50 having the single-circle type light source back-side reflecting surface portion 52 as a comparative example shown in FIG. 1. In FIG. 4, the axis of abscissas represents the outer diameter of a used hot-cathode fluorescent lamp. As clear from FIG. 4, in the double-circle type, there is obtained a light use efficiency of 5 to 10% higher than that in the single-circle type shown in FIG. 1. It is also shown that the light use efficiency becomes higher when using a thinner lamp.

A liquid crystal display according to Embodiment 1 of this invention comprises the liquid crystal display backlight unit according to this embodiment as described above and the liquid crystal panel 10.

In this invention, a light source is not limited to a hot-cathode fluorescent lamp and may be a cold-cathode fluorescent lamp or an LED array comprising a plurality of LEDs arranged in the longitudinal direction.

Further, this invention is not limited to the structure in which light sources are provided with respect to upper and lower two sides of a liquid crystal panel, respectively. Light sources may be provided with respect to left and right two sides of a liquid crystal panel, respectively, or with respect to upper, lower, left, and right four sides of a liquid crystal panel, respectively, or a light source may be provided with respect to only any one of upper, lower, left, and right four sides of a liquid crystal panel.

Embodiment 2

Figure 5:
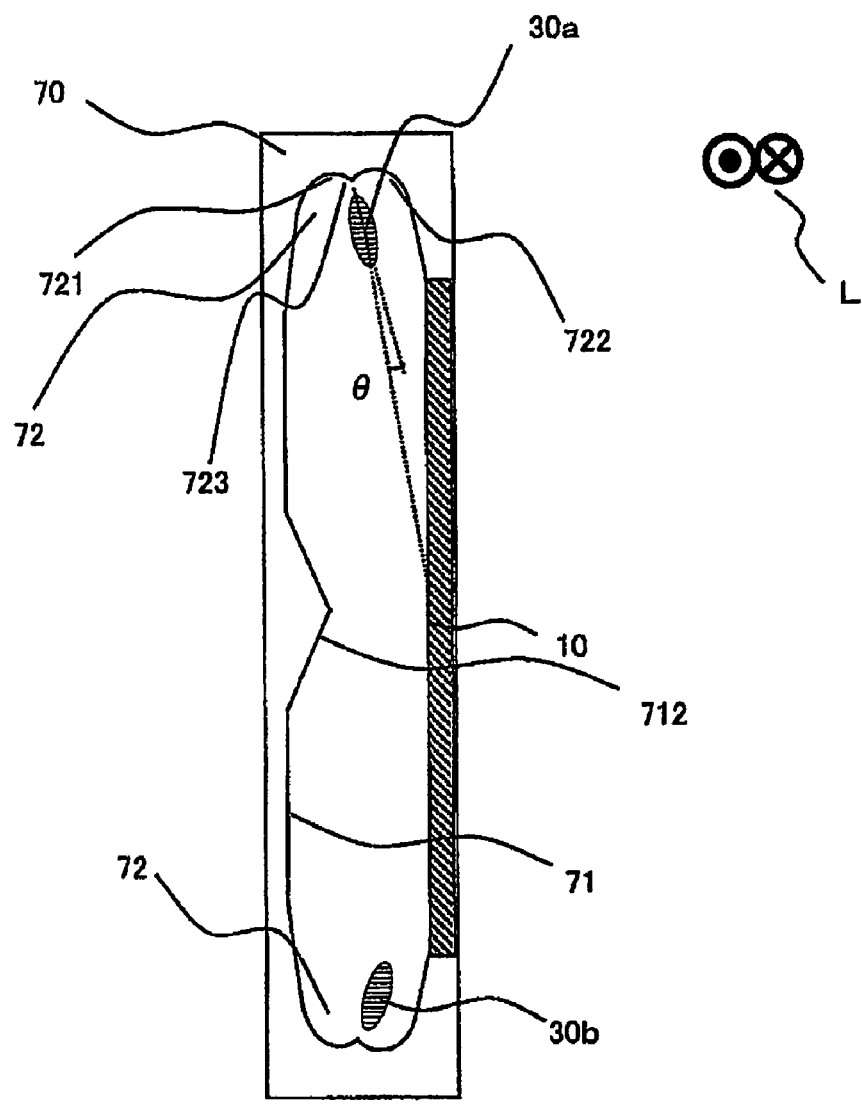
FIG. 5 is a cross-sectional view showing the structure of a liquid crystal display backlight unit according to Embodiment 2 of this invention.

Referring to FIG. 5, a liquid crystal display backlight unit according to Embodiment 2 of this invention comprises, like in Embodiment 1 shown in FIGS. 2 and 3, hot-cathode fluorescent lamps 30a and 30b as light sources each having a shape with a longitudinal direction L and disposed on the back side of a liquid crystal panel 10 and on the outside of upper and lower sides of the liquid crystal panel 10, with their longitudinal direction L along those sides, respectively, and a reflector 70 serving to reflect light, radiated from the peripheries of the hot-cathode fluorescent lamps 30a and 30b, so as to be incident on the back surface of the liquid crystal panel 10. The reflector 70 comprises a main reflecting surface portion 71 facing the back surface of the liquid crystal panel 10 and light source back-side reflecting surface portions 72 facing at least regions, not facing the back surface of the liquid crystal panel 10, of the peripheries of the hot-cathode fluorescent lamps 30a and 30b, respectively. The main reflecting surface portion 71 of the reflector 70 includes, in its vertical center region, a mountain-shaped portion 712 projecting toward the liquid crystal panel 10. Further, a reflecting film mainly of aluminum is coated on the surface of the main reflecting surface portion 71 and the light source back-side reflecting surface portions 72 of the reflector 70. However, silver may be coated instead and, in either case, a protective film may further be formed on the reflecting film.

Further, also in this liquid crystal display backlight, like in Embodiment 1, the light source back-side reflecting surface portion 72 of the reflector 70 includes a mountain-shaped portion 723 as a shape in a cross-section perpendicular to the longitudinal direction L of the hot-cathode fluorescent lamp 30a (30b). The mountain-shaped portion 723 is defined by two inclined concave surfaces and projects toward the hot-cathode fluorescent lamp 30a (30b). The light source back-side reflecting surface portion 72 further includes two concave surface portions 721 and 722 respectively comprising the inclined concave surfaces of the mountain-shaped portion 723 and concave surfaces extending from the inclined concave surfaces, respectively, as a shape in a cross-section perpendicular to the longitudinal direction L of the hot-cathode fluorescent lamp 30a (30b). The light source back-side reflecting surface portion 72 is also the double-circle type in terms of its cross-sectional shape.

Particularly, in this liquid crystal display backlight, different from Embodiment 1, the hot-cathode fluorescent lamps 30a and 30b each have an elliptic shape as a cross-sectional shape perpendicular to the longitudinal direction L. The hot-cathode fluorescent lamp is disposed such that a major-axis direction of the ellipse forms an angle θ of about 5 degrees with respect to a line segment connecting the center of the ellipse and the center of the liquid crystal panel 10 in a direction perpendicular to the side thereof (in a vertical direction in the figure).

In the case where the angle θ representing the direction of the ellipse as the cross-sectional shape of the hot-cathode fluorescent lamp 30a (30b) is 90 degrees or less, the ratio in which light radiated from the hot-cathode fluorescent lamp 30a (30b) directly hits (returns to) the hot-cathode fluorescent lamp 30a (30b) after hitting and reflecting from the reflector 70 is, for example, smaller than that in the case of a light source being circular in cross-section and having as its radius the major axis of the ellipse. That is, in this embodiment, even if use is made of a filament having a length equal to that of a filament in a hot-cathode fluorescent lamp circular in cross-section, it is possible to improve the light use efficiency so as to be substantially equal to that in the case of using a thinner circular lamp. That is, as seen from the graph of the light use efficiency shown in FIG. 4, the light use efficiency becomes higher as the lamp tube becomes smaller and, in the case of an ellipse in cross-section, the efficiency becomes substantially equal to that of a lamp being circular in cross-section and having a radius of a length between the major axis and the minor axis. As an effect of this embodiment, it is possible to improve the light use efficiency without shortening the lifetime of a lamp as compared with the case of a circular lamp.

Figure 6:
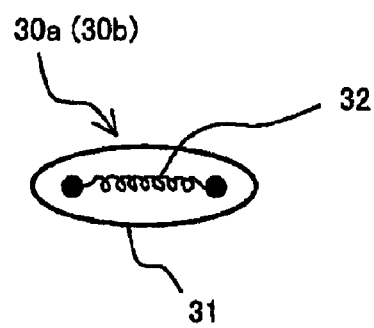
FIG. 6 is a cross-sectional view of a fluorescent lamp in the liquid crystal display backlight unit shown in FIG. 5.

Referring to FIG. 6, in the liquid crystal display backlight unit according to Embodiment 2 of this invention, the hot-cathode fluorescent lamp 30a (30b) comprises a glass tube 31 having an elliptic shape in cross-section and a filament 32 disposed along the major-axis direction of the ellipse in each of end regions in the longitudinal direction L.

As a result, the filament 32 can be made equal to or longer than conventional.

A liquid crystal display according to Embodiment 2 of this invention comprises the liquid crystal display backlight unit according to this embodiment as described above and the liquid crystal panel 10.

In this invention, the cross-sectional shape perpendicular to the longitudinal direction of a light source is not limited to an elliptic shape, but may be an oblong circular shape.

An angle θ formed between a major-axis direction of an ellipse or an oblong circle in cross-section and a line segment connecting the center of the ellipse or the oblong circle and the center of a liquid crystal panel in a direction perpendicular to a side thereof may be 90 degrees or less. However, it is preferable that the angle θ be smaller.

In this invention, a light source is not limited to a hot-cathode fluorescent lamp and may be a cold-cathode fluorescent lamp or an LED array comprising a plurality of LEDs arranged in the longitudinal direction.

Further, this invention is not limited to the structure in which light sources are provided with respect to upper and lower two sides of a liquid crystal panel, respectively. Light sources may be provided with respect to left and right two sides of a liquid crystal panel, respectively, or with respect to upper, lower, left, and right four sides of a liquid crystal panel, respectively, or a light source may be provided with respect to only any one of upper, lower, left, and right four sides of a liquid crystal panel.

Embodiment 3

Figure 7:
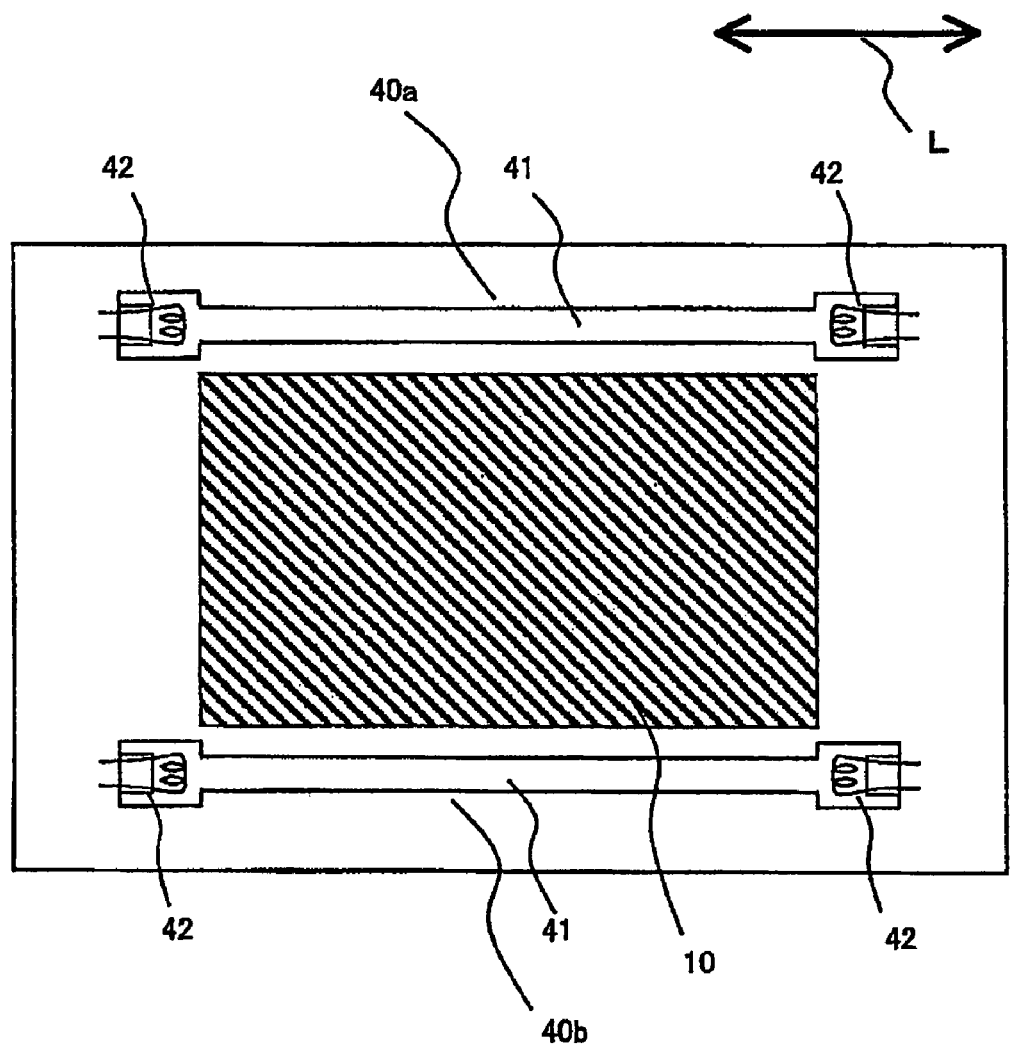
FIG. 7 is a front view showing, in a see-through manner, the structure of the main part of a liquid crystal display backlight unit according to Embodiment 3 of this invention.

A liquid crystal display backlight unit according to Embodiment 3 of this invention shown in FIG. 7 comprises, like in Embodiment 1 or 2, hot-cathode fluorescent lamps 40*a* and 40*b* as light sources each having a shape with a longitudinal direction L and disposed on the back side of a liquid crystal panel 10 and on the outside of upper and lower sides of the liquid crystal panel 10, with their longitudinal direction L along those sides, respectively, and a reflector (not shown) serving to reflect light, radiated from the peripheries of the hot-cathode fluorescent lamps 40*a* and 40*b*, so as to be incident on the back surface of the liquid crystal panel 10.

Although not illustrated, the reflector in this embodiment also comprises, like in Embodiment 1 or 2, a main reflecting surface portion facing the back surface of the liquid crystal panel 10 and light source back-side reflecting surface portions facing at least regions, not facing the back surface of the liquid crystal panel 10, of the peripheries of the hot-cathode fluorescent lamps 40*a* and 40*b*, respectively. A reflecting film mainly of aluminum is coated on the surface of the main reflecting surface portion and the light source back-side reflecting surface portions of the reflector. However, silver may be coated instead and, in either case, a protective film may further be formed on the reflecting film. Further, the light source back-side reflecting surface portion of the reflector includes a mountain-shaped portion as a shape in a cross-section perpendicular to the longitudinal direction L of the hot-cathode fluorescent lamp 40*a* (40*b*). The mountain-shaped portion is defined by two inclined concave surfaces and projects toward the hot-cathode fluorescent lamp 40*a* (40*b*). The light source back-side reflecting surface portion further includes two concave surface portions respectively comprising the inclined concave surfaces of the mountain-shaped portion and concave surfaces extending from the inclined concave surfaces, respectively, as a shape in a cross-section perpendicular to the longitudinal direction L of the hot-cathode fluorescent lamp 40*a* (40*b*). This light source back-side reflecting surface portion is also the double-circle type in terms of its cross-sectional shape.

Particularly, in this liquid crystal display backlight, different from Embodiment 1 or 2, the hot-cathode fluorescent lamps 40*a* and 40*b* each comprise a light-emitting portion 41 and two electrode portions 42.

The light-emitting portions 41 respectively extend along the upper and lower sides of the liquid crystal panel over a length equal to or slightly greater than that of the upper or lower side and each have a circular shape as a shape in a cross-section perpendicular to the longitudinal direction L.

The electrode portions 42 are provided at both ends in the longitudinal direction of the light-emitting portion and the shape of each electrode portion in a cross-section perpendicular to the longitudinal direction L is a circular shape with a diameter greater than that of the light-emitting portion 41. A filament is disposed in each electrode portion 42.

The reflector according to this embodiment serves to reflect light radiated from the periphery of the light-emitting portion 41 in the hot-cathode fluorescent lamp 40*a* (40*b*).

As a result, the light-emitting portion of the hot-cathode fluorescent lamp 40*a* (40*b*) is small in diameter and thus, like in the liquid crystal display backlight unit shown in FIG. 5, there is obtained an effect similar to that in the case of a normal light source using a smaller tube without reducing the size of the electrode portions (without shortening the filaments) and, as seen from the graph shown in FIG. 4, the light use efficiency is improved.

A liquid crystal display according to Embodiment 3 of this invention comprises the liquid crystal display backlight unit according to this embodiment as described above and the liquid crystal panel 10.

In this invention, a light source is not limited to a hot-cathode fluorescent lamp and may be a cold-cathode fluorescent lamp.

Further, this invention is not limited to the structure in which light sources are provided with respect to upper and lower two sides of a liquid crystal panel, respectively. Light sources may be provided with respect to left and right two sides of a liquid crystal panel, respectively, or with respect to upper, lower, left, and right four sides of a liquid crystal panel, respectively, or a light source may be provided with respect to only any one of upper, lower, left, and right four sides of a liquid crystal panel.

INDUSTRIAL APPLICABILITY

This invention is not only quite effectively applied to a 30-inch or more large-sized liquid crystal display, but also applicable to a small-sized liquid crystal display.

The invention claimed is:

1. A liquid crystal display backlight unit wherein said unit comprises:

a light source having a shape with a longitudinal direction and disposed on a back side and on an outside of a side of the liquid crystal panel having a rectangular plate shape, with said longitudinal direction along said side; and a reflector reflecting light, radiated from a periphery of said light source, so as to be incident on a back surface of the liquid crystal panel;

wherein said reflector includes:

a main reflecting surface portion facing the back surface of the liquid crystal panel; and a light source back-side reflecting surface portion facing at least a region, not facing the back surface of the liquid crystal panel, of the periphery of said light source;

wherein said light source back-side reflecting surface portion of said reflector comprises, as a shape in a cross-section perpendicular to said longitudinal direction of said light source, a mountain-shaped portion defined by two inclined concave surfaces and projecting toward said light source, wherein said light source, as a shape in a cross-section perpendicular to said longitudinal direction, has an oblong circular shape or an elliptic shape and is disposed so that a major-axis direction of the oblong circle or the ellipse forms an angle of 90 degrees or less with respect to a line segment connecting a center of the oblong circle or the ellipse and a center of the liquid crystal panel in a direction perpendicular to said side thereof.

2. The liquid crystal display backlight unit according to claim 1, wherein said light source back-side reflecting surface portion further comprises, as a shape in a cross-section perpendicular to said longitudinal direction of said light source, two concave surface portions, said concave surface portions including said inclined concave surfaces of said mountain-shaped portion and concave surfaces extending from said inclined concave surfaces, respectively.

3. A liquid crystal display comprising said liquid crystal display backlight unit according to claim 2 and a liquid crystal panel.

4. The liquid crystal display backlight unit according to claim 1, wherein said light source is a fluorescent lamp.

5. The liquid crystal display backlight unit according to claim 4, wherein said light source is a hot-cathode fluorescent lamp.

6. A liquid crystal display comprising said liquid crystal display backlight unit according to claim 5 and a liquid crystal panel.

7. The liquid crystal display backlight unit according to claim 4, wherein said light source comprises:
   a light-emitting portion extending along said side of the liquid crystal panel over a length equal to or greater than that of said side and having a circular shape as a shape in a cross-section perpendicular to said longitudinal direction; and
   electrode portions provided at both ends of said light-emitting portion in said longitudinal direction and each having a circular shape with a diameter greater than that of said light-emitting portion as a shape in a cross-section perpendicular to said longitudinal direction, each of said electrode portions comprising a filament disposed therein;
   wherein said reflector reflects light radiated from a periphery of said light-emitting portion of said light source.

8. A liquid crystal display comprising said liquid crystal display backlight unit according to claim 7 and a liquid crystal panel.

9. A liquid crystal display comprising said liquid crystal display backlight unit according to claim 4 and a liquid crystal panel.

10. The liquid crystal display backlight unit according to claim 1, wherein said liquid crystal display backlight unit comprises the light sources provided for two opposite sides of the liquid crystal panel, respectively.

11. A liquid crystal display comprising said liquid crystal display backlight unit according to claim 10 and a liquid crystal panel.

12. The liquid crystal display backlight unit according to claim 1, wherein said light source is an LED array having a plurality of LEDs arranged in said longitudinal direction.

13. A liquid crystal display comprising said liquid crystal display backlight unit according to claim 12 and a liquid crystal panel.

14. A liquid crystal display comprising said liquid crystal display backlight unit according to claim 1 and a liquid crystal panel.

15. A liquid crystal display backlight unit wherein said unit comprises:
   a light source having a shape with a longitudinal direction and disposed on a back side and on an outside of a side of the liquid crystal panel having a rectangular plate shape, with said longitudinal direction along said side; and
   a reflector reflecting light, radiated from a periphery of said light source, so as to be incident on a back surface of the liquid crystal panel;
   wherein said reflector includes:
   a main reflecting surface portion facing the back surface of the liquid crystal panel; and
   a light source back-side reflecting surface portion facing at least a region, not facing the back surface of the liquid crystal panel, of the periphery of said light source;
   wherein said light source back-side reflecting surface portion of said reflector comprises, as a shape in a cross-section perpendicular to said longitudinal direction of said light source, a mountain-shaped portion defined by two inclined concave surfaces and projecting toward said light source,
   wherein said light source is a fluorescent lamp, and
   wherein said light source, in an end region in said longitudinal direction, has an oblong circular shape or an elliptic shape as a shape in a cross-section perpendicular to said longitudinal direction and comprises a filament disposed along a major-axis direction of the oblong circle or the ellipse.

16. A liquid crystal display comprising said liquid crystal display backlight unit according to claim 15 and a liquid crystal panel.

17. A liquid crystal display comprising:
   a liquid crystal display backlight unit comprising:
      a light source having a shape with a longitudinal direction and disposed on a back side and on an outside of a side of the liquid crystal panel having a rectangular plate shape, with said longitudinal direction along said side; and
      a reflector reflecting light, radiated from a periphery of said light source, so as to be incident on a back surface of the liquid crystal panel;
      wherein said reflector includes:
         a main reflecting surface portion facing the back surface of the liquid crystal panel; and
         a light source back-side reflecting surface portion facing at least a region, not facing the back surface of the liquid crystal panel, of the periphery of said light source; and
   a liquid crystal panel,
   wherein said light source back-side reflecting surface portion of said reflector comprises, as a shape in a cross-section perpendicular to said longitudinal direction of said light source, a mountain-shaped portion defined by two inclined concave surfaces and projecting toward said light source, and
   wherein said light source, as a shape in a cross-section perpendicular to said longitudinal direction, has an oblong circular shape or an elliptic shape and is disposed so that a major-axis direction of the oblong circle or the ellipse forms an angle of 90 degrees or less with respect to a line segment connecting a center of the oblong circle or the ellipse and a center of the liquid crystal panel in a direction perpendicular to said side thereof.

* * * * *